Figure 1:
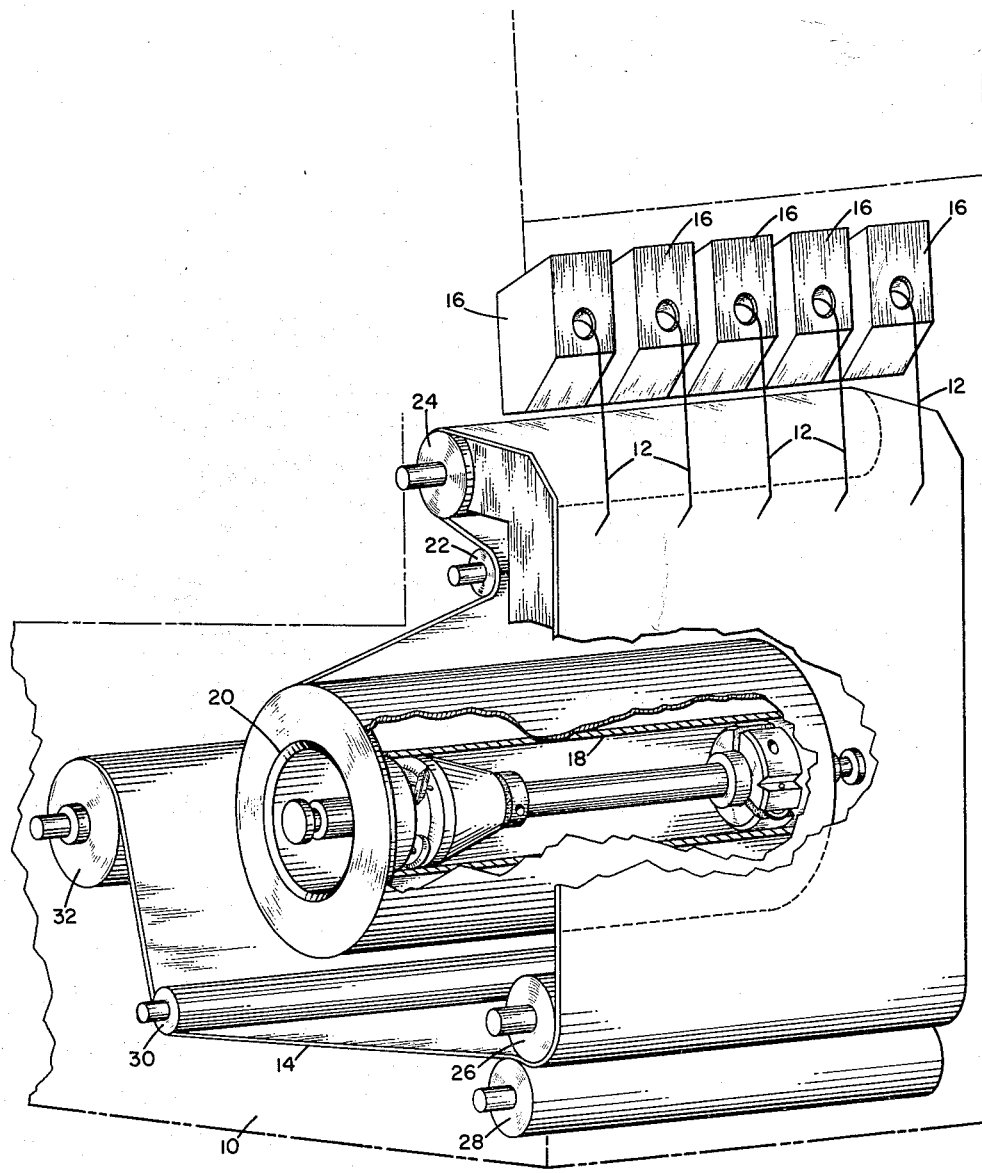

April 13, 1965 E. O. SCHWEITZER 3,178,126
CHART TUBE RETAINING MEANS FOR RECORDER
Filed March 15, 1963 2 Sheets-Sheet 2

INVENTOR.
EARL O. SCHWEITZER
BY James A. Smith
ATTORNEY

United States Patent Office 3,178,126
Patented Apr. 13, 1965

3,178,126
CHART TUBE RETAINING MEANS FOR RECORDER
Earl O. Schweitzer, Wickliffe, Ohio, assignor to Clevite Corporation, a corporation of Ohio
Filed Mar. 15, 1963, Ser. No. 265,393
13 Claims. (Cl. 242—68.3)

This invention relates to recording devices and, specifically, to an improved means for retaining a movable record medium in alignment with a marking means therefor.

The invention is primarily intended for use in a strip chart recorder having a chart tube supported by a main supply roller from which the chart is removed to pass a suitable marking device such as an ink writing pen. The marked chart in such recorders is wound on a second chart tube supported by a rewind roller or merely permitted to discharge externally of the recorder chassis.

Chart misalignment in a recorder of the aforementioned type can seriously affect the accuracy of the record produced. For example, if the chart marking device is positioned relative to the moving chart in accordance with the magnitude of a variable, even a very minute lateral displacement of the moving chart can result in an inaccurate record.

Two major considerations are important in connection with proper chart alignment. First, with respect to any one chart roll, it is essential that the lateral position of the chart be maintained until the chart supply is exhausted. Secondly, it is essential that a new chart roll substituted for a depleted roll assume the same lateral position. If such alignment conditions can be maintained accurate operation of the recorder will be achieved.

The usual method of achieving chart alignment is to provide an index plate on the supply roller which is engaged by the end of the chart tube. In some instances mere frictional engagement of the chart tube with the roller surface is relied on to maintain the desired position while in other instances special detent means are provided. Both methods are subject to disadvantages.

The mere frictional retention of the chart tube has been found to possess limitations in that variation in the diameter of the chart tubes (usually of cardboard material) result in variations in the frictional holding force with different tubes. Accordingly, in many instances slippage and misalignment occurs.

The detent means generally utilized are difficult to operate and usually possess "spring back" which results in a variable clearance between the chart tube and index plate. Thus, chart tube retaining methods heretofore employed do not generally result in optimum alignment conditions.

It is a principal object of the present invention to maintain accurate alignment of a movable record medium relative to a marking means therefor during a recording operation.

Another object of the invention is to provide an improved chart tube supporting roller for a recording device.

Another object of the invention is to provide a plurality of helically mounted wheels on a chart tube support roller which enables the chart tube to be twisted into engagement with an index plate.

In a preferred embodiment of the invention a chart tube support roller is provided with an index plate at one end thereof adapted to be engaged by a chart tube containing a roll of chart paper. Intermediate the ends of the roller are mounted a plurality of radially spaced wheels defining a periphery corresponding in diameter to the inner diameter of a chart tube to be supported. The wheels are generally positioned in a plane perpendicular to the longitudinal axis of the roller but are each helically mounted to define a plane of rotation having a predetermined angular relationship to the roller axis. A chart tube to be supported is inserted over the end of the roller opposite from the index plate and axially displaced until the end thereof engages the wheels. Application of a twisting torque to the chart tube then causes the tube to be rotated and axially displaced through rolling engagement with the wheels to be thereby effectively screwed into engagement with the index plate.

Figure 2:
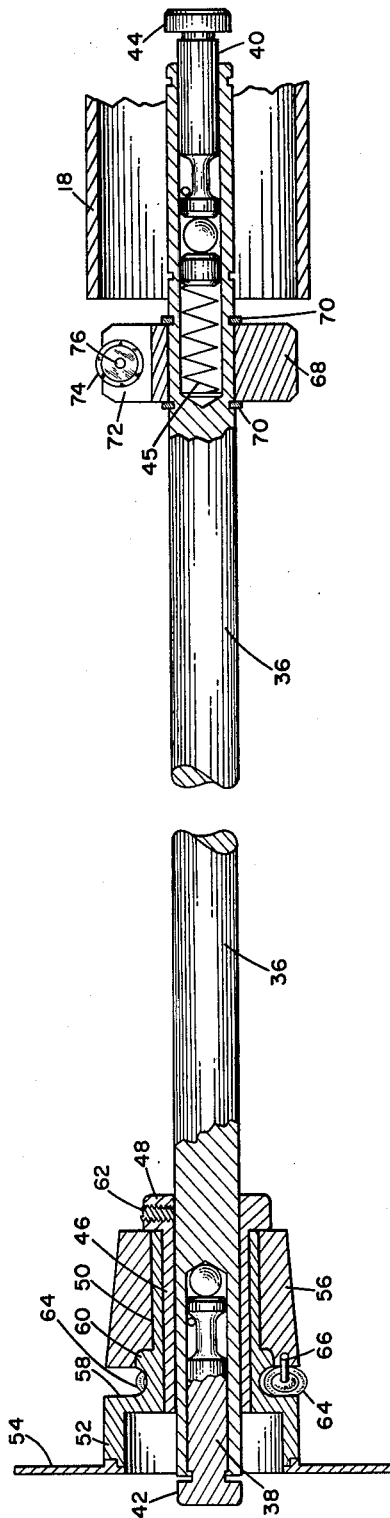

Other objects and advantages will become apparent from the following description taken in connection with the accompanying drawings wherein:

FIGURE 1 is a perspective view in partial schematic illustrating generally the application of the invention to a recorder; and FIGURE 2 is a longitudinal view in partial section of the chart support roller illustrated in FIGURE 1.

Referring to FIGURE 1 of the drawings I have shown in somewhat schematic form a recorder 10 having a plurality of ink writing pens 12 adapted to be positioned relative to a movable record medium 14 by pen positioning devices 16, respectively. Recorder 10 as disclosed for exemplary purposes comprises a high speed oscillographic recorder of a commercially available type. It will be apparent, however, as the description proceeds that the invention is not limited in application to the specific recorder shown and may be variously applied.

Record medium 14 comprises a movable paper strip chart which is obtained commercially rolled on a chart tube 18 generally of cardboard or other low cost disposable material. Chart tube 18 is supported on a main chart supply roller 20 which is constructed in accordance with the invention and which will later be described in detail.

In operation of the recorder illustrated the chart 14 is unrolled from tube 18 during rotation of roller 20 by driving means not shown and positioned by means of rollers 22, 24, 26, 28 and 30 and other surfaces not visible to be marked by pens 12 and viewed from the recorder front.

The marked chart is rewound on a chart tube (not shown) supported by a rewind roller 32 also constructed in accordance with the invention and driven by a motor (not shown). Alternatively, chart 14 after passing between rollers 26 and 28 may be permitted to discharge exteriorly of the recorder.

It will be apparent from considering the physical structure thus far described that the accuracy of the chart record produced by pens 12 is dependent on the maintenance of exact lateral alignment of the chart 14 with respect to the described parts. Even slight lateral shifting of the record medium will produce an inaccurate record, and, accordingly, it will be appreciated that the axial positions of chart tubes 18 supported by supply roller 20 and rewind roller 32 are extremely critical.

Referring now to FIGURE 2 the rollers 20 and 32 comprise an elongated small diameter shaft 36 having axial bores in the opposite ends thereof in which are retained bearing assemblies 38 and 40 for rotatably supporting the roller assembly between opposite sidewalls of the recorder chassis. Assemblies 38 and 40 may comprise, for example, ball bearings 42 and 44 have outer raceways adapted to be received in suitable supporting brackets (not shown) on the sidewalls of the recorder chassis. Bearing assembly 38 has a fixed axial position while bearing assembly 40 is spring biased by spring 45 to incorporate length adjustability to facilitate mounting in the supporting brackets.

At the left end of the roller assembly, a sleeve 46 having a flange 48 is fixed to the shaft 36 and provides a mounting surface for a generally tubular part 50 having a larger diameter end portion 52 to the end of which is attached a circular chart tube index plate 54. The peripheral surface of portion 52 is slightly smaller in diameter than the chart tube 18 to slidably receive the end of the tube 18 as will be hereinafter described.

A sleeve 56 is seated on the small diameter portion of part 50 and has a tapered peripheral surface substantially contiguous with the surface of portion 52. The left end of sleeve 56 terminates in spaced relationship with the right end of portion 52 to define a peripheral recess or cavity 58. An annular shoulder 60 of tubular part 50 is received in a complemental annular recess of sleeve 56 as shown to inhibit axial movement of sleeve 56 to the left relative to part 50. Movement to the right is inhibited by flange 48 which engages the right end of sleeve 56 and part 50 as shown. In assembly of the parts, sleeve 56 is slidably positioned on part 50 whereupon part 50 is forcefitted on sleeve 46. The resulting assembly is fixed to shaft 36 by means of a set screw 62 threaded in flange 48 and defines a supporting means for the helically mounted wheels now to be described.

A plurality of small diameter wheels 64 (in this case, three) are rotatably mounted within annular recess 58 and radially spaced on a circle around the longitudinal axis of shaft 36. Wheels 64 have a knife edge periphery projecting beyond the peripheral surface of portion 52 and define a peripheral surface slightly larger in diameter than the inner surface of the chart tube to be supported by the roller assembly.

Each wheel 64 is mounted on an axle pin 66 having ends received within suitable oppositely disposed bores in portion 52 and sleeve 56. Each axle pin 66 is mounted with a predetermined angular relationship (20 degrees is satisfactory) between its longitudinal axis and the longitudinal axis of shaft 36 thereby causing the peripheral edge of the wheel mounted thereon to define a helical edge with respect to the peripheral surfaces of sleeve 56 and portion 52. Wheels 64 and axle pins 66 are mounted as described during mounting of sleeve 56 on part 50.

Means are provided adjacent the right end of shaft 36 to permit the chart tube 18 to be freely displaced axially into engagement with wheels 64 and to rigidly support the right end of chart tube 18 when the left end thereof engages index plate 54. More specifically a disk-shaped member 68 is rotatably mounted on shaft 36 adjacent the right end thereof between a pair of retaining rings 70 received in suitable annular recesses in the surface of shaft 36 to determine the axial position of member 68.

Disk-shaped member 68 is provided with a plurality of radially spaced recesses 72 (in this instance, three) in the peripheral surface thereof in which are mounted a plurality of small diameter wheels 74, respectively, by means of axle pins 76. Pins 76 are mounted in suitable oppositely disposed bores in the sidewalls of recesses 72 whereby each pin has a perpendicular relationship with the longitudinal axis of shaft 76 and each wheel 74 defines a radial plane with said longitudinal axis. The knife edge peripheries of wheels 74 extend beyond the peripheral surface of member 68 to be engaged by the interior wall surface of the chart tube 18 as will now be described.

To install a chart tube 18 on roller assembly 20 the end of tube 18 is positioned over the right end of shaft 36 as shown in FIGURE 2 and displaced axially into engagement with wheels 74. Further displacement of tube 18 to the left will cause wheels 74 to engage the interior wall surface of tube 18. Further displacement of the tube 18 to the left will be thus facilitated by rotation of wheels 74, and such movement is effected until the left end of tube 18 is fitted over tapered sleeve 56 into engagement with the helically positioned wheels 64.

When thus positioned in engagement with wheels 64 a simple rotative twisting torque is imparted to the tube 18 and wheels 64 rotate in engagement with the interior wall surface to effect rotative axial displacement of the tube into firm engagement with the index plate 54. Thus, helically disposed wheels 64 function similar to screw threads but are operative upon application of a small torque to render the chart tube installation very simple. During rotative movement of tube 18 into engagement with index plate 54 rotation of member 68 on shaft 36 will occur to facilitate the last assembly step.

The roller assembly is particularly suitable for supporting the ordinary low cost cardboard chart tubes. The knife edge peripheries of wheels 64 and 74 indent the cardboard surfaces engaged thereby and rigidly support the chart tube without "spring back." Accordingly, the invention is particularly desirable in connection with low cost cardboard chart tubes which heretofore have been difficult to maintain in a desired axial position.

With the particular angular relationship of the helical wheels 64 illustrated in FIGURE 2 a clockwise torque is applied to chart tube 18 to effect displacement of the same into engagement with index plate 54. While the cutting engagement of the wheels 64 into the cardboard surface of chart tube 18 is sufficient to effect retention of the chart tube; the retention is insured in the case of rewind roller 32 by the roller during torque which is imparted to the roller assembly in a counterclockwise direction with the particular roller arrangement shown in FIGURE 1. It will be apparent that by reversing the helical arrangement of the wheels 64 a similar seating action can be insured in an application when the roller assembly is subjected to a clockwise driving torque.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

It is claimed and desired to secure by Letters Patent of the United States:

1. A device for supporting a hollow tube in a predetermined axial position comprising: an elongated shaft member; an indexing part mounted on said shaft member adjacent one end thereof to be engaged by the tube; and at least one rotatable element rotatably supported on said shaft member and defining a rotational axis having a predetermined angular relationship with the longitudinal axis of said shaft member; said element being positioned to be engaged by the internal wall surface of the tube and to displace the tube into engagement with said indexing part upon rotation of the tube.

2. A device for supporting a hollow tube in a predetermined axial position comprising: an elongated shaft member; an indexing part mounted on said shaft member adjacent one end thereof to be engaged by the tube; and a plurality of radially spaced wheels supported on said member for engagement with the inner wall surface of the tube; each of said wheels being positioned to define a plane of rotation helically disposed relative to the longitudinal axis of said shaft member whereby the tube may be positioned in engagement with said wheels and rotated to undergo axial displacement into engagement with said indexing part.

3. A roller assembly for supporting a hollow chart tube within a recorder in operative alignment with a chart marking device comprising: an elongated shaft member adapted to be rotatably supported on the recorder; an indexing part mounted on said shaft member adjacent one end thereof to be engaged by the chart tube; and at least one rotatable element rotatably supported on said shaft member and defining a rotational axis having a predetermined angular relationship with the longitudinal axis of said shaft member, said element being positioned to be engaged by the internal wall surface of the chart tube and to displace the chart tube axially into engagement with said indexing part upon rotation of the chart tube.

4. A roller assembly for supporting a hollow chart tube within a recorder in operative alignment with a chart marking device comprising: an elongated shaft member adapted to be rotatably supported on the recorder; an indexing part mounted on said shaft member adjacent one end thereof to be engaged by the chart tube; and a plurality of radially spaced wheels having rotational axis in a predetermined angular relationship with the longitudinal axis of said shaft member supported on said member to be engaged by the interior wall surface of the chart tube whereby the chart tube may be rotated and displaced axially by said wheels into tight engagement with said indexing part.

5. A roller assembly for supporting a hollow chart tube in a recorder in operative alignment with a chart marking device comprising: an elongated shaft adapted to be rotatably supported on the recorder; an indexing plate fixedly mounted on said shaft adjacent one end thereof to be engaged by the chart tube; and a plurality of radially spaced wheels positioned on a circle about the longitudinal axis of said shaft and defining generally a periphery adapted to be received within the tube in engaging relationship with the interior wall surface of the tube; said wheels each having a rotational axis disposed in a predetermined angular relationship with the longitudinal axis of said shaft whereby the tube may be inserted over said wheels in engagement therewith and twisted to be displaced axially into engagement with said index plate.

6. A roller assembly for supporting a hollow chart tube within a recorder in operative alignment with a chart marking device comprising: an elongated shaft adapted to be rotatably supported on the recorder; an index plate mounted on said shaft adjacent one end thereof to be engaged by the chart tube; means mounted on said shaft defining an annular peripheral surface adjacent said index plate adapted to be slidably received within said tube; and a plurality of wheels rotatably supported by said means with the peripheries thereof extending slightly above said surface to be engaged by the interior wall surface of the chart tube, the rotational axis of said wheels having a predetermined angular relationship with said shaft whereby rotation of a chart tube placed in engagement with said wheels results in axial displacement of the tube into firm engagement with said index plate.

7. A roller assembly for supporting a hollow chart tube within a recorder in operative alignment with a chart marking device comprising: an elongated shaft member adapted to be rotatably supported on the recorder; an index plate mounted on said shaft adjacent one end thereof to be engaged by the chart tube to determine the axial position thereof relative to the marking device; means mounted on said shaft adjacent said index plate defining an annular peripheral surface smaller in diameter than the inside diameter of the chart tube; and a plurality of small diameter wheels rotatably supported by said means adjacent the surface thereof in equal radial spaced relationship to define generally a plane perpendicular to the longitudinal axis of said shaft member and an annular periphery adapted to be engaged by the interior wall surface of the chart tube; said wheels each having a rotational axis having a predetermined angular relationship with the longitudinal axis of said shaft member whereby the chart tube when positioned into engagement with said wheels may be rotated and displaced axially by said wheels into engagement with said index plate.

8. A roller assembly as claimed in claim 7 wherein each of said wheels has a sharp peripheral edge.

9. A roller assembly as claimed in claim 8 wherein said means comprises a pair of tubular parts mounted on said shaft with adjacent end portions in spaced relationship to define an annular recess; said wheels being positioned in said recess and having axle pins rotatably mounted at opposite ends in said end portions respectively.

10. A roller assembly as claimed in claim 9 wherein the periphery defined by said wheels is larger in diameter than the inner diameter of the chart tube.

11. A roller assembly as claimed in claim 10 comprising three wheels having rotational axis each positioned in a 20 degree angular relationship with said shaft.

12. A roller assembly for supporting a hollow chart tube within a recorder in operative alignment with a chart marking device comprising: an elongated shaft adapted to be rotatably supported on the recorder; a circular index plate mounted on said shaft adjacent one end thereof to be engaged by and determine the axial position of the chart tube; a plurality of small diameter radially spaced wheels rotatably mounted on said shaft adjacent said plate on a circle perpendicular to the longitudinal axis of said shaft to engage the interior wall surface of the chart tube and support one end thereof; each of said wheels having a rotational axis having a predetermined angular relationship with the longitudinal axis of said shaft whereby rotation of the chart tube in engagement with said wheels will effect axial displacement of the chart tube into engagement with said index plate; and means at the opposite end of said shaft for supporting the other end of the chart tube and to permit free axial and rotative movement thereof.

13. A roller assembly as claimed in claim 12 wherein said means comprises a disk-shaped member rotatably mounted on said shaft and having a second plurality of radially spaced small diameter wheels mounted adjacent the periphery thereof to engage the interior wall surface of the chart tube; said second wheels each having a rotational axis perpendicular to the longitudinal axis of said shaft.

References Cited by the Examiner
UNITED STATES PATENTS

| | | | |
|---|---|---|---|
| 1,037,988 | 9/12 | Richards | 242—68.1 |
| 2,231,140 | 2/41 | Richardson | 242—68.1 |
| 2,523,806 | 9/50 | Bohne | 242—129.51 |
| 2,898,137 | 8/59 | Kreske | 242—68.3 |
| 2,923,489 | 2/60 | Bunch | 242—68.3 |

JORDAN FRANKLIN, *Primary Examiner.*